April 21, 1931.  J. M. SCHILTZ  1,801,821
ANIMAL TRAP
Filed Aug. 8, 1928   2 Sheets-Sheet 1
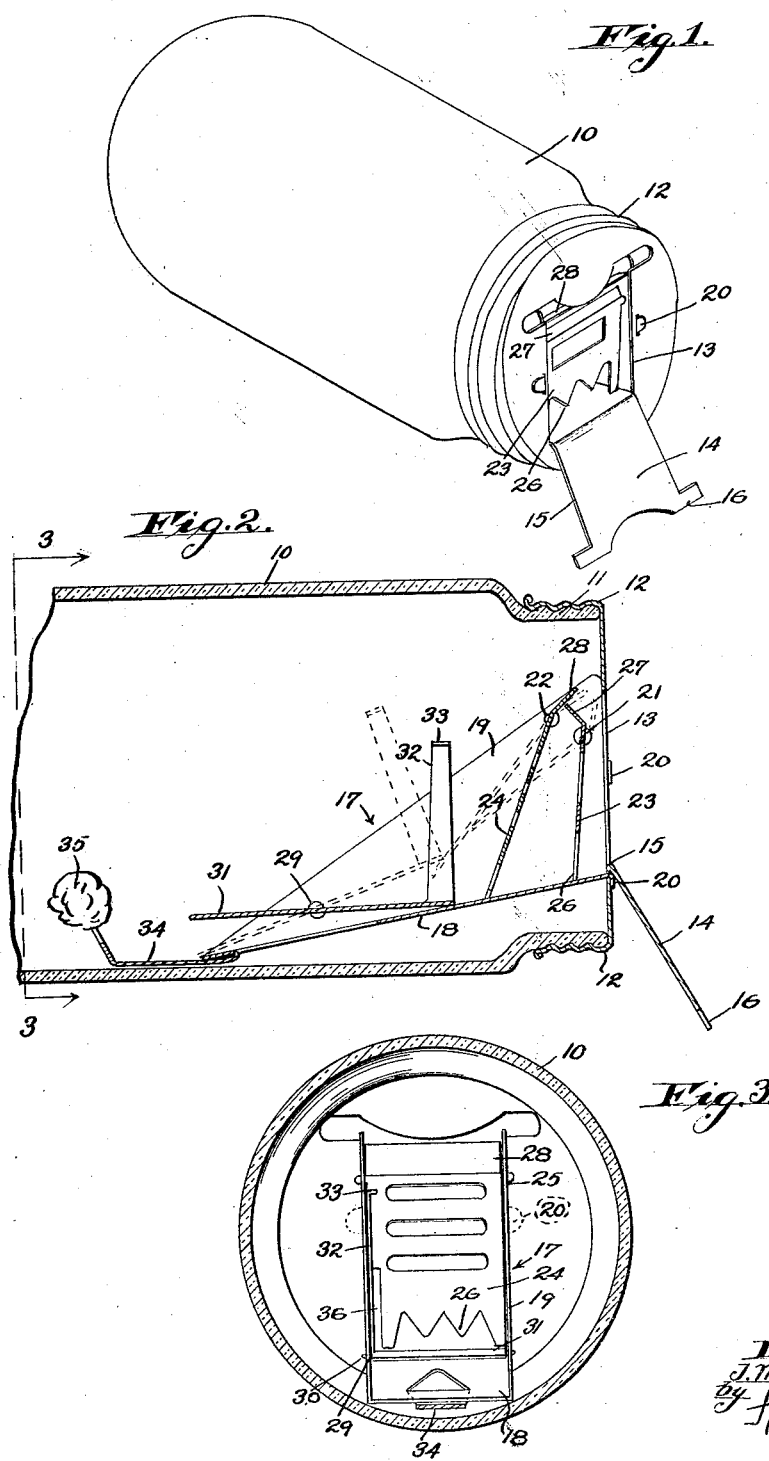

April 21, 1931.  J. M. SCHILTZ  1,801,821
ANIMAL TRAP
Filed Aug. 8, 1928   2 Sheets-Sheet 2
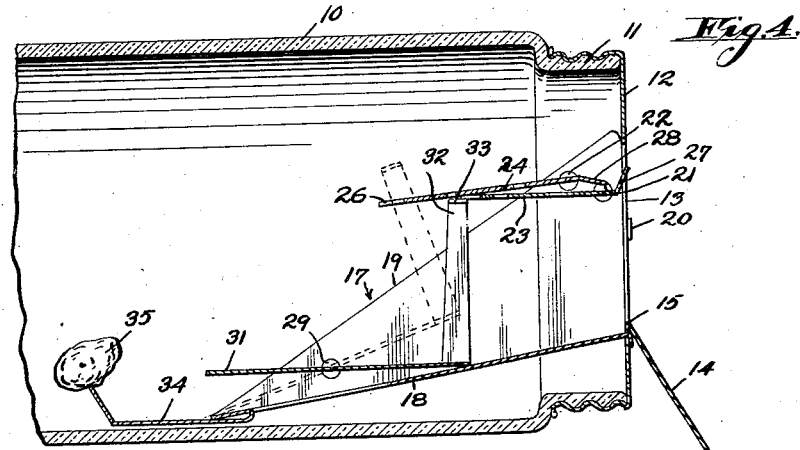
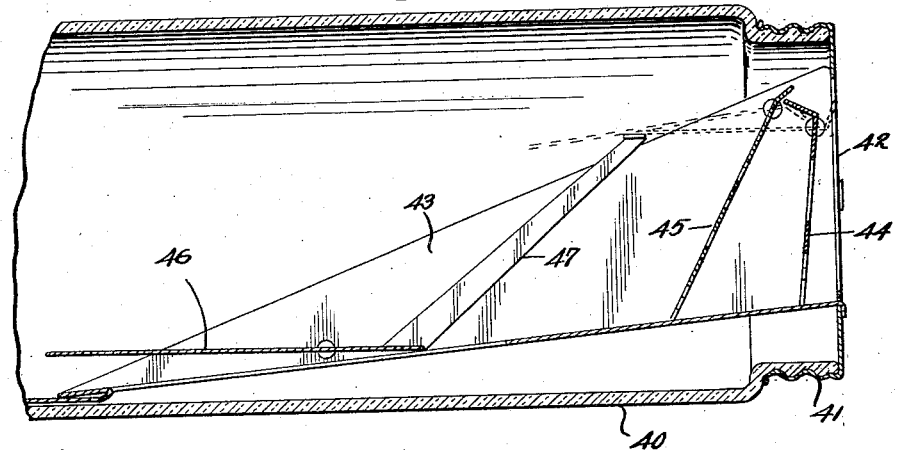
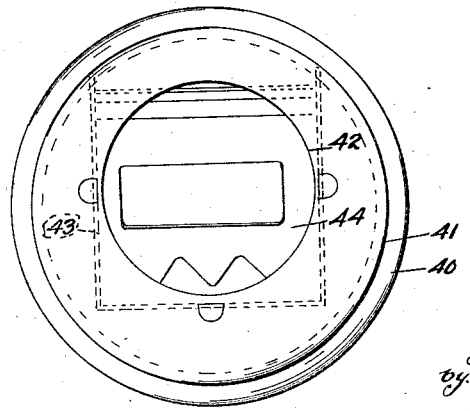
Inventor
J. M. Schiltz
by Hazard and Miller
Attorneys Patented Apr. 21, 1931

1,801,821

UNITED STATES PATENT OFFICE

JOHN M. SCHILTZ, OF LOS ANGELES, CALIFORNIA

ANIMAL TRAP

Application filed August 8, 1928. Serial No. 298,188.

This invention relates to improvements in animal traps and particularly to traps designed to catch rodents such as rats and mice.

An object of the invention is to provide an improved animal trap which may be easily, quickly and cheaply constructed and which will not only entice animals into the trap but safely confine them therein.

Another object of the invention is to provide an improved animal trap wherein there is a container having an entrance with two doors for closing the entrance which have parts engageable with a chute so that when the doors are in closed position they cannot be opened from the inside to permit the escape of an animal or rodent, but may be opened from the outside to permit the entrance and entrapping of additional animals.

Another object of the invention is to provide an animal trap consisting of a container having an entrance closable by one or more doors and which has a construction for holding the doors open until the animal has entered the container and then releasing the doors, allowing them to close.

With the foregoing and other objects in view which will be made manifest in the following detailed description and specifically pointed out in the appended claims, reference is had to the accompanying drawings for an illustrative embodiment of the invention wherein;

Fig. 1 is a perspective view of one form of the improved animal trap.

Fig. 2 is a longitudinal, vertical section through the improved animal trap.

Fig. 3 is a vertical transverse section taken substantially upon the line 3—3, upon Fig. 2.

Fig. 4 is a view similar to Fig. 2, illustrating the trap in its initial set position.

Fig. 5 is a longitudinal, vertical section through a modified form of the construction of the improved trap.

Fig. 6 is a front view in elevation of the modification shown in Fig. 5.

Referring to the accompanying drawings wherein similar reference characters designate similar parts throughout the improved animal trap has disclosed in Figures 1 to 4 inclusive, consists of a container 10 which in the preferred form of construction is a glass jar which is transparent so that the interior may be seen through the walls thereof. The neck of the jar is preferably threaded as indicated at 11 so as to receive a metal cap 12. An opening 13 is formed in the cap providing an entrance to the container and in the modification shown in Figures 1–4 inclusive. This opening is formed by striking out a portion 14 of the cap and bending it downwardly on its lower edge 15 to form a step shown in Fig. 1. This portion preferably has lateral feet 16 adapted to engage the floor and prevent the container 10 from rolling. Behind the cap 12 and behind the opening 13 therein, there is formed a chute, generally indicated at 17. This chute is formed by taking a section of sheet metal and bending it to provide a bottom 18 and upstanding, parallel sides 19. The forward edges of the sides and bottom fit against the interior surface of the cap 12 about the opening 13 and have lugs 20 formed thereon which extend through apertures in the cap and which are clinched over against the forward side of the cap. In this manner the chute is permanently and rigidly fastened to the cap 12, forming a passage through which animals entering the opening 13 may pass into the jar 10. In each of the upstanding sides 19, adjacent its forward end there are formed two apertures 21 and 22 which are circular in form. Two gates or doors 23 and 24 are provided which fit between the upstanding sides 19. Each door has lugs 25 formed on its side edges adjacent their upper ends which lugs extend through the apertures 21 and 22 serving as trunnions on which the doors pivot. The doors 23 and 24 are preferably perforated and have their lower edges toothed as indicated at 26. They are arranged, one behind the other and are of such length that when the doors are in closed positions their bottom edges will engage the bottom 18 of the chute. The forward door 23 has its top bent rearwardly as indicated at 27, above its pivot forming a rearwardly and upwardly extending flange constituting an abutment. The rear door 24 has its upper end bent slightly forward as indicated at 28. The purpose of this construction will be hereinafter more fully set forth.

Near the rear of the sides 19 there are formed apertures 29 which receive lugs 30 formed on the side edges of a treadle 31 so that the treadle will be pivotally mounted above the bottom of the chute and between the side walls. The pivot of the treadle is located at approximately its center. The treadle 31 carries an upstanding finger 32, the top of which is bent inwardly a short distance, as indicated at 33, constituting a trigger. The bottom 18 of the chute has a tongue 34 struck out and bent rearwardly, forming a bait holder for the bait 35.

The operation of the improved animal trap is as follows: The trap is initially set as indicated in Fig. 4 with the bait 35 on the bait holder 34 and the doors 23 and 24 swung rearwardly. The rear door 24 is recessed as indicated at 36 so that it may pass upwardly without engaging the trigger 33. The forward door 23 is of such a length that when it is swung rearwardly its bottom edge will engage the forward edge of the finger 32, swinging the treadle 31 slightly to enable the forward door 23 to be swung above the trigger 33. The doors are then released with the forward door 23 resting on the trigger 33 and the door 24 resting on the door 23.

When an animal approaches the trap it is possible for it to look through the opening 13 and the chute to see the bait. It may enter the trap through the opening in the chute. When it walks on the forward half of the treadle 31 no movement of the trap takes place but as the animal continues and places its weight on the rear half of the treadle, the treadle pivots on its trunnions 30 lifting the trigger and releasing the forward door 23 which was supporting the rear door 24. Both doors then fall by gravity into the position shown in Fig. 2. When in such position it is possible for additional animals to enter the trap. They may see the animal already entrapped eating the bait and endeavor to also enter. A second animal on entering the trap merely pushes inwardly against the doors, first moving the outer door 23 so that the abutment 27 is no longer opposite the portion 28. When in this position the second door is about to be pushed inwardly and both doors can be moved inwardly to permit the entrance of the second animal. The second animal does not move the doors sufficiently high as to again set them on the trigger 33. If the second animal should move the doors sufficiently high as to again set them on the trigger the movement of the second animal on to the treadle will cause the doors to be released again. If the second animal occupies the chute, escape of the animal which may be already entrapped in the container is effectively prevented while the doors are open. In this way it is possible to catch a plurality of animals in the same trap at the same time.

It has been experienced that certain rodents such as rats and mice have sufficient intelligence to endeavor to get out of the trap and to lift the door closing the entrance. Escape in this manner from the improved trap is prevented. If the animal places his paws beneath the toothed edge of the rear door 24 and endeavors to lift it, the portion 28 swings against the part 27 preventing this movement and tending to swing the forward door 23 into a closed position.

The improved animal trap is also advantageous in that if the trap is turned over, the doors will not open to permit the escape of the animal. When the trap is turned over it frequently happens that the door 24 tends to swing into open position causing the portions 27 and 28 to engage. The friction between these portions is sufficient to prevent further opening movement, and the doors will thus remain closed. However, as the doors may not catch in the position last mentioned further precaution is taken. When the trap is turned over the forward portion of the treadle 31 being the heavier, this portion will swing downwardly as indicated in dotted lines on Fig. 2. It will usually swing downwardly very quickly before the door 24 swings downwardly. The length of the door 24 is such that when the treadle is in the dotted line position the bottom edge of the door will engage the forward edge of the treadle to prevent further opening movement.

In the modification disclosed in Figs. 5 and 6 there is a trap of somewhat larger construction designed to entrap larger animals. This construction consists of a jar or container 40 having a cap 41 in which is formed a large circular opening 42. The chute 43 is fastened to the cap in a manner similar to the chute 17 and is provided with two doors 44 and 45 which are constructed like the doors 23 and 24 and which operate in the same manner. The treadle 46 which is pivoted in the chute has its upstanding finger 47 extending upwardly and forwardly forming the trigger supporting the doors in their set position. The treadle functions in the same manner as the treadle 31 but is given the shape shown in Fig. 5 so that the chute 43 may be lengthened to accommodate larger animals.

From the above described construction it will be appreciated that a novel animal trap is provided having a container which has an entrance closable by double doors. The doors are so constructed as to permit an animal to enter the container but it is impossible to open the doors from the interior. The doors can be easily opened, however, from the exterior to permit the entrance of a second or more animals to be entrapped therein. It will further be appreciated that the improved animal trap is of cheap, simple and durable construction and can be applied to any container desired.

Various changes may be made in the details of construction without departing from the spirit or scope of the invention as designed by the appended claims.

I claim,

1. An animal trap comprising means providing a container having an entrance, two doors pivoted adjacent the entrance and arranged one behind the other, means on the outer door adapted to be engaged by the inner door when the doors are in closed position for preventing the doors from being opened from the inside but permitting them to be opened from the outside, and a trigger pivotally mounted adjacent the doors adapted to be engaged by an animal, for releasably holding the doors in open position.

2. An animal trap comprising means providing a container having an entrance, two pivoted doors, arranged one behind the other, adapted to be closed by gravity for closing the entrance, means providing an abutment on the outer door adjacent its pivot adapted to be engaged by the inner door when the doors are in closed position to prevent the doors from being opened from the inside but permitting them to be opened from the outside, and a treadle pivotally mounted behind the doors, said treadle carrying a trigger for releasably holding both doors in open position.

3. An animal trap comprising means, providing a container having an entrance, two doors arranged, one behind the other for closing the entrance, and a trigger for holding both doors open but adapted to release them on an animal entering the container, and means for preventing the doors from being opened from the inside of the container but permitting them to be opened from the outside.

4. An animal trap comprising means, providing a container, a chute leading into the container, a door for closing the chute, a treadle pivotally mounted in the chute, and a trigger carried by the treadle adapted to hold the door in open position but to release it when the treadle is walked on by an animal, said treadle and door being so formed that if the trap is placed in an inverted position the treadle will be engaged by the door to prevent its moving into open position.

5. An animal trap comprising means providing a container, a chute leading into the container, two doors arranged one behind the other for closing the chute, a treadle pivotally mounted in the chute, and a trigger operable by the treadle adapted to hold both doors in open position until the treadle is walked on and then to release them.

6. An animal trap comprising means providing a container, a chute leading into the container, two doors arranged one behind the other for closing the chute, a treadle pivotally mounted in the chute, and a trigger operable by the treadle adapted to hold both doors in open position until the treadle is walked on and then to release them, and a tongue struck out of the bottom of the chute beneath the treadle and bent to form a bait holder.

7. An animal trap comprising means providing a container, a chute leading into the container, two doors arranged one behind the other for closing the chute, a treadle pivotally mounted in the chute, and a trigger operable by the treadle adapted to hold both doors in open position until the treadle is walked on and then to release them, and means for preventing the doors from being opened from the inside but permitting them to be opened from the outside.

In testimony whereof I have signed my name to this specification.

JOHN M. SCHILTZ.